US011378949B2

(12) United States Patent
Moore et al.

(10) Patent No.: US 11,378,949 B2
(45) Date of Patent: Jul. 5, 2022

(54) SYSTEMS AND METHODS FOR AUTONOMOUSLY CONTROLLING MOVEMENT OF DELIVERY VEHICLES

(71) Applicant: OMNITRACS, LLC, Dallas, TX (US)

(72) Inventors: Maxwell Cabell Moore, Chicago, IL (US); Christopher Harlan Hove, Alexandria, VA (US)

(73) Assignee: OMNITRACS, LLC, Dallas, TX (US)

( * ) Notice: Subject to any disclaimer, the term of this patent is extended or adjusted under 35 U.S.C. 154(b) by 279 days.

(21) Appl. No.: 16/447,322

(22) Filed: Jun. 20, 2019

(65) Prior Publication Data

US 2020/0401130 A1   Dec. 24, 2020

(51) Int. Cl.
*G05D 1/00* (2006.01)
*G05D 1/02* (2020.01)
*B60W 50/00* (2006.01)

(52) U.S. Cl.
CPC ......... *G05D 1/0027* (2013.01); *G05D 1/0088* (2013.01); *G05D 1/0212* (2013.01); *B60W 2050/0005* (2013.01); *B60W 2050/009* (2013.01); *B60W 2050/0075* (2013.01); *B60W 2556/45* (2020.02)

(58) Field of Classification Search
CPC .. G05D 1/0027; G05D 1/0088; G05D 1/0212; B60W 2050/0005; B60W 2050/0077; B60W 2050/009
USPC .......................................................... 701/23
See application file for complete search history.

(56) References Cited

U.S. PATENT DOCUMENTS

| 9,256,852 | B1* | 2/2016 | Myllymaki | ............. B60P 3/007 |
| 9,958,964 | B2 | 5/2018 | Wurster | |
| 10,671,961 | B2* | 6/2020 | Cao | ......................... G06Q 50/30 |
| 2015/0338226 | A1* | 11/2015 | Mason | .................... G06Q 10/04 |
| | | | | 701/408 |
| 2016/0334236 | A1* | 11/2016 | Mason | ..................... G08G 1/22 |
| 2017/0075435 | A1* | 3/2017 | Wurster | ............. G06F 3/04166 |
| 2018/0232839 | A1* | 8/2018 | Heinla | ............... G06Q 10/0832 |
| 2020/0159251 | A1* | 5/2020 | Iwasaki | .................. G06Q 10/20 |

FOREIGN PATENT DOCUMENTS

WO     2018099135 A1     7/2018

OTHER PUBLICATIONS

International Search Report and Written Opinion issued for PCT/US2020/037816 dated Sep. 17, 2020.

* cited by examiner

*Primary Examiner* — Yazan A Soofi
(74) *Attorney, Agent, or Firm* — ArentFox Schiff LLP (57) ABSTRACT

The disclosure provides a system and method for autonomously routing delivery vehicles. An autonomous routing system may generate, a plurality of routing passes, each routing pass including a set of parameters, by a processor using one or more business rules that describe a set of allowed values for one or more of the parameters. The autonomous routing system may Execute each the plurality of routing passes on a routing platform configured to generate a routing plan corresponding to a single routing pass. autonomous routing system may select, by the processor, one of the plurality of routing passes according to a comparison rule set that assigns a score to each routing plan corresponding to a respective one of the plurality of routing passes. The autonomous routing system may dispatch the selected routing pass via the routing platform.

18 Claims, 3 Drawing Sheets

SYSTEMS AND METHODS FOR AUTONOMOUSLY CONTROLLING MOVEMENT OF DELIVERY VEHICLES

BACKGROUND

The present disclosure generally relates to a system for routing delivery vehicles, in particular for routing multiple vehicles to fulfil orders.

Conventionally, systems may manage the operation of a fleet of vehicles. For example, systems may manage vehicles that deliver packages or cargo. One inefficiency in such systems is that a human operator is often responsible for configuring parameters, which may change from day to day. Human operators may gather information from multiple sources and manually configure parameters for a routing system, which is a time-consuming task and subject to human error.

Additionally, such human operators often have some degree of flexibility or tolerance with respect to certain parameters, but the routing system may require a particular parameter.

In view of the above, it can be appreciated that there are problems, shortcomings or disadvantages associated with user interaction with routing system, and that it would be desirable if improved systems and methods for operating routing systems were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method of routing delivery vehicles. The method may include generating, by a processor, a plurality of routing passes, each routing pass including a set of parameters, using one or more business rules that describe a set of allowed values for one or more of the parameters. The method may include executing each the plurality of routing passes on a routing platform configured to generate a routing plan corresponding to a single routing pass. The method may include selecting, by the processor, one of the plurality of routing passes according to a comparison rule set that assigns a score to each routing plan corresponding to a respective one of the plurality of routing passes. The method may include dispatching the selected routing pass via the routing platform.

In another aspect, the disclosure provides a system for routing delivery vehicles. The system may include a memory storing computer-executable instructions. The system may include a network interface in communication with a routing platform. The system may include a processor communicatively coupled with the memory and the communications interface and configured to execute the computer-executable instructions. The processor may generate a plurality of routing passes, each routing pass including a set of parameters, using one or more business rules that describe a set of allowed values for one or more of the parameters. The processor may execute each the plurality of routing passes on a routing platform configured to generate a routing plan corresponding to a single routing pass. The processor may select one of the plurality of routing passes according to a comparison rule set that assigns a score to each routing plan corresponding to a respective one of the plurality of routing passes. The processor may dispatch the selected routing pass via the routing platform.

In another aspect, the present disclosure provides a non-transitory computer-readable medium storing computer-executable instructions. The non-transitory computer-readable medium may include instructions to generate a plurality of routing passes, each routing pass including a set of parameters, using one or more business rules that describe a set of allowed values for one or more of the parameters. The non-transitory computer-readable medium may include instructions to execute each the plurality of routing passes on a routing platform configured to generate a routing plan corresponding to a single routing pass. The non-transitory computer-readable medium may include instructions to select one of the plurality of routing passes according to a comparison rule set that assigns a score to each routing plan corresponding to a respective one of the plurality of routing passes. The non-transitory computer-readable medium may include instructions to dispatch the selected routing pass via the routing platform.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Routing platforms provide a powerful tool for improving the efficiency of logistics for various businesses. A routing platform may receive orders defining products or packages and delivery locations. The routing platform may also be configured with resources for fulfilling the order. The routing platform may also be configured with various parameters for routing the resources to fulfil the orders. In an aspect, a set of parameters may be referred to as a routing pass. Known routing platform include a large number of parameters. For example, the Omnitracs One or Roadnet Anywhere routing platform, available from Omnitracs LLC of Dallas, Tex., includes more than 100 configurable parameters. The configurable parameters may include, for example but not limited hereto, binary values, time values, quantity values, selection of options, and/or scalable priorities.

In existing systems, a human operator may use a web service provided by the routing platform to configure the routing system with a configuration including values for various routing parameters. The routing platform may execute a routing algorithm based on the received orders and the configuration to generate a routing plan for fulfilling the orders that satisfies the constraints indicated by the configuration. A human operator that is aware of flexibility of the configuration of routing parameters may attempt to improve the generated routing plan by altering configuration the configuration of routing parameters and executing the routing algorithm again. This approach is essentially a trial-and-error process that is time consuming and subject to mistakes by the human operator.

In contrast, the present disclosure provides for an autonomous routing system that interacts with a routing platform. That is, the autonomous routing system provides an additional software layer on top of the routing platform for improving the user interface with the routing platform. In particular, the autonomous routing system may automate some tasks conventionally performed by a human operator of the routing platform and perform additional operations that may be unfeasible for a human operator. The autonomous routing system may also exploit parallel operations to improve the speed of a routing process. Thus, the autonomous routing system provides an improvement over existing routing platforms.

Figure 1:
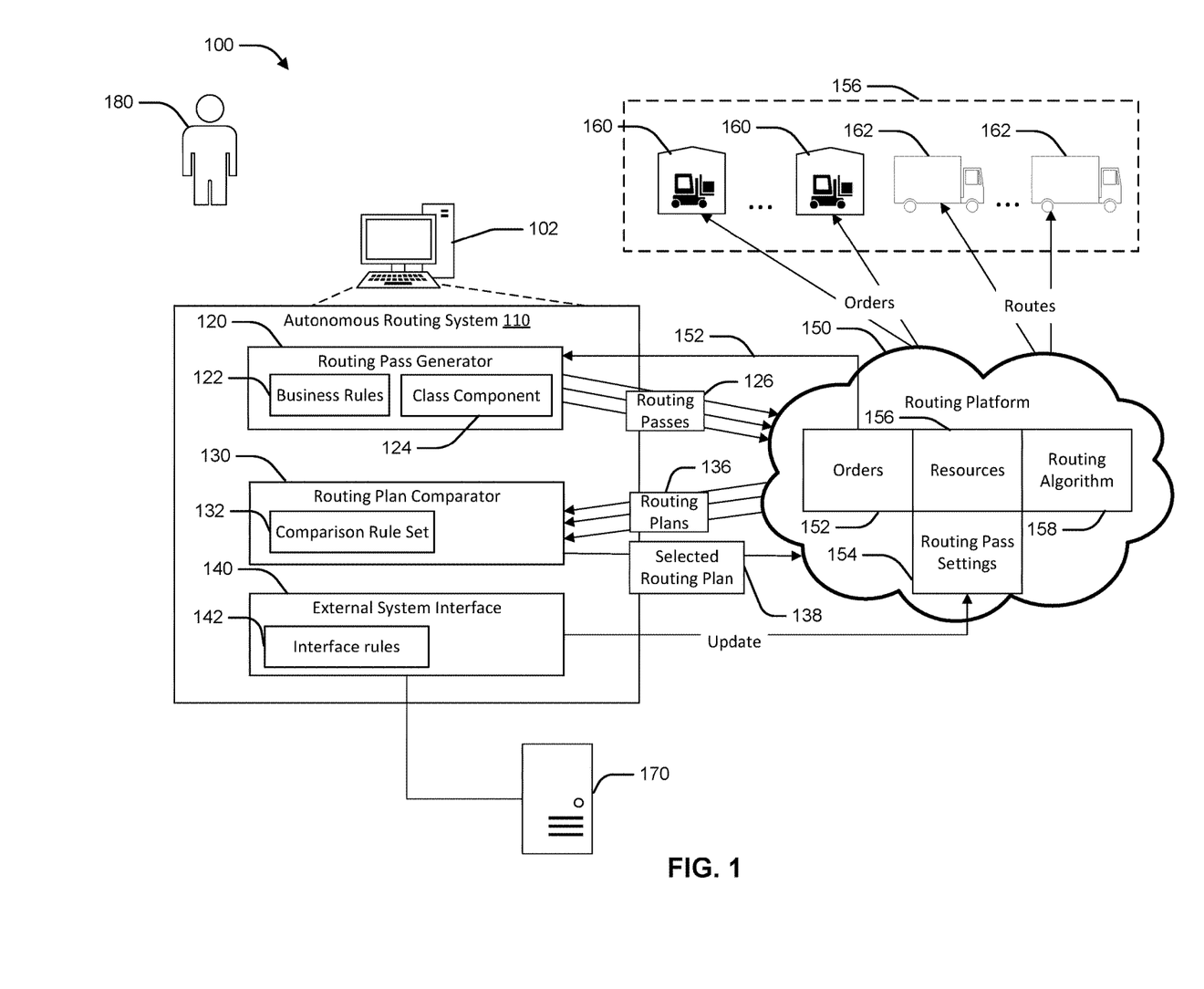
FIG. 1 is a conceptual diagram of an example autonomous routing system.

Turning now to the Figures, FIG. 1 illustrates an example logistics system 100 including an autonomous routing system 110 that determines routing plans via a routing platform 150 based on information from one or more external systems 170 and a configuration from a user 180. The autonomous routing system 110 may receive the configuration from the user 180, and autonomously obtain information from the one or more external systems 170 based on the configuration. The autonomous routing system 110 may generate routing passes to be executed by the routing system to create routing plans. A routing pass may be a set of parameters defining user requirements and/or goals for routing. The routing pass parameters may be set by the routing platform 150, for example, as routing pass settings 154. A routing plan may specify movements of one or more delivery vehicles. For example, a routing plan may specify at least an identifier of a package, good, or service and one stop. Typically, a routing plan may also include multiple stops, an order of the stops, directions between the stops, times for the stops, vehicles, drivers, delivery instructions, or other information to control one or more delivery vehicles. The autonomous routing system 110 may select one of the routing plans and dispatch the selected routing plan via the routing platform 150 to control resources such as warehouses and vehicles.

The routing platform 150 may be a commercial routing platform such as the OMNITRACS ONE platform provided by Omnitracs, LLC of Dallas, Tex. The routing platform 150 may perform specific routing actions for a user, who may be, for example, an operator representing a business. The routing platform 150 may receive and store orders 152. An order 152 may include at least an identification of an item (e.g., product or package) and a destination (e.g., an address). The routing platform 150 may also store resources 156. Resources 156 may identify resources that the business may use to fulfil the orders 152. For example, the resources 156 may identify warehouses 160 and vehicles 162. The routing platform 150 may execute a routing algorithm 158 to generate a routing plan 136 by assigning resources to orders and determining a route for each vehicle 162 to follow to deliver the orders. The routing algorithm 158 may be based on routing pass settings 154 that define various constraints for the routing algorithm 158. In an aspect, the routing platform 150 may receive routing passes 126 from the autonomous routing system 110.

The autonomous routing system 110 may provide an interface between the user 180 and the routing platform 150. The autonomous routing system 110 may include a routing pass generator 120 that generates a plurality of different routing passes for execution by the routing platform, a routing plan comparator 130 that receives routing plans from the routing pass generator and selects one of the plans, and an external system interface 140 that receives updates of routing parameters from one or more external systems 170. The autonomous routing system 110 may be configured by a user 180, who may define business rules 122, a comparison rule set 132, and interface rules 142. The autonomous routing system 110 may automatically generate routing passes 126 for execution by the routing platform 150, compare various routing plans 136, and select one routing plan for the routing platform 150 to dispatch. The autonomous routing system 110 may also collect information from the one or more external systems, update the routing platform 150 based on the collected information, and update the external systems 170 based on determinations by the autonomous routing system 110 and/or the routing platform 150.

The external system interface 140 may communicate with one or more external systems 170. The external systems 170 may include any system that may have information related to the logistics of the business. For example, the external systems 170 may include a vehicle repair service that provides a repair status of the vehicles 162. The routing platform 150 may store information about the vehicles 162, but may not directly communicate with such an external service. The external system interface 140 may be configured with interface rules 142 that define how to acquire, process, and update information from external systems 170. For example, for the example vehicle repair service, the interface rules 142 may indicate a time to acquire a vehicle status from the vehicle repair service, for example, before generating routing passes 126. The interface rules 142 may include rules for converting a data format of the vehicle repair service into a data format of the routing platform 150. For example, the interface rules 142 may correlate vehicle identifiers, and map repair information into an available or unavailable status. The external system interface 140 may export the updated information to the routing platform 150. For example, the external system interface 140 may update a number of vehicles available for routing the orders. Other examples of external systems may include point of sale (POS) or third party sales systems that generate orders, employee management systems (e.g., payroll) that determine employee availability, customer relationship management system that manages customer addresses for pickups, delivery, or service, and inventory or warehouse management systems that provide product availability.

The routing pass generator 120 may generate a plurality of routing passes 126 based on business rules 122. The business rules 122 may define a time and date for generating and executing the routing passes 126 and the parameters for each routing pass 126. The parameters for each routing pass 126 may depend on the time or date for executing the routing pass 126. The parameters for the routing passes 126 generated by the routing pass generator 120 may correspond to the routing pass settings 154. That is, each routing pass 126 may be a different combination of routing pass settings 154. The business rules 122 may define the different combinations. For example, the business rules 122 may define multiple values or a range for a parameter such as a start time, maximum time, or maximum number of stops. Similarly, the routing pass settings 154 may include goals having sliding preference levels. The business rules 122 may define different combinations of preference level. In an aspect, the routing pass generator 120 may generate a routing pass including a value for each parameter of the routing pass settings 154. For example, if the business rules 122 do not define a value for a parameter, the routing pass generator 120 may set a default value for the parameter. For example, default values may be 0, null, blank, or false depending on the parameter.

In an aspect, the routing pass generator 120 may include a class component 124 that manages multiple classes of deliveries. For example, the multiple classes may correspond to customer levels, where higher customer levels receive priority in shipping, guaranteed delivery times, or other special treatment. The class component 124 may be configured to perform routing according to a priority level associated with each class of delivery. For example, the class component 124 may access business rules 122 to determine a class of an order based on one or more properties such as a customer name, customer identifier, delivery address, order size, or other property selected by user 180. The class component 124 may assign a priority level to each order based on the determined class. The class component 124 may prioritize classes by routing each class separately in order of priority level. For example, the class component 124 may collect all orders and route a subset of orders in a highest priority class with routing pass settings 154 defining any rules for that class. The class component 124 may then update the routing pass settings 154 and route a subset of orders for a second class without deleting the routing plan for the highest priority class. The routing platform 150 will update the routing plan to include the second class of orders while maintaining the routing of the highest priority orders. For example, the highest priority orders may remain assigned to a particular vehicle and delivery window, but the additional orders for the second class of orders may be added before or after the existing routing for the highest priority orders. The class component 124 may proceed with routing each class of delivery sequentially.

The routing plan comparator 130 may compare routing plans 136 generated by the routing platform 150 based on a comparison rule set 132. For example, the routing plan comparator 130 may assign a score to each routing plan 136 based on the comparison rule set. In an aspect, a base rule may define a base score. For example, the base score may be a total cost or profit of the routing plan. The comparison rule set 132 may include a set of logical conditions. For example, the comparison rule set 132 may include mandatory rules that a routing plan 136 must meet in order to be acceptable. For example, a mandatory condition may state that if a number of remaining unrouted orders is greater than zero, the routing plan is unacceptable. If a routing plan 136 does not satisfy a mandatory condition, the routing plan 136 may be excluded from being selected, or may be assigned a minimum score that will prevent the routing plan 136 from being selected. As another example, the comparison rule set 132 may include one or more balancing conditions that adjust the score based on whether the balancing condition is met. For instance, a balancing condition may be defined for one or more goals for each order (e.g., on time) or each vehicle 162 (e.g., meets target start time). Whenever a routing plan 136 does not meet the defined goal, a penalty may be applied to the score (e.g., increasing a cost or reducing a profit). Conversely, the score may be increased (e.g., decreasing a cost or increasing a profit) when a goal is met (e.g., vehicle 162 finishes early). The user 180 may configure the balancing rules based on priorities of the business. For example, the adjustments may correspond to actual financial incentives (e.g., credits applied to customer accounts for late deliveries) or represent reputational valuations. In any case, the routing plan comparator 130 may determine a total score for each routing plan 136. In an aspect, the routing plan comparator 130 may automatically select a best routing plan (e.g., highest or lowest score based on the metric) and send a dispatch command including a selected routing pass 138 to the routing platform 150 to dispatch the best routing plan. In another aspect, the routing plan comparator 130 may provide the user 180 with the best routing plan and request approval to dispatch the routing plan.

Figure 2:
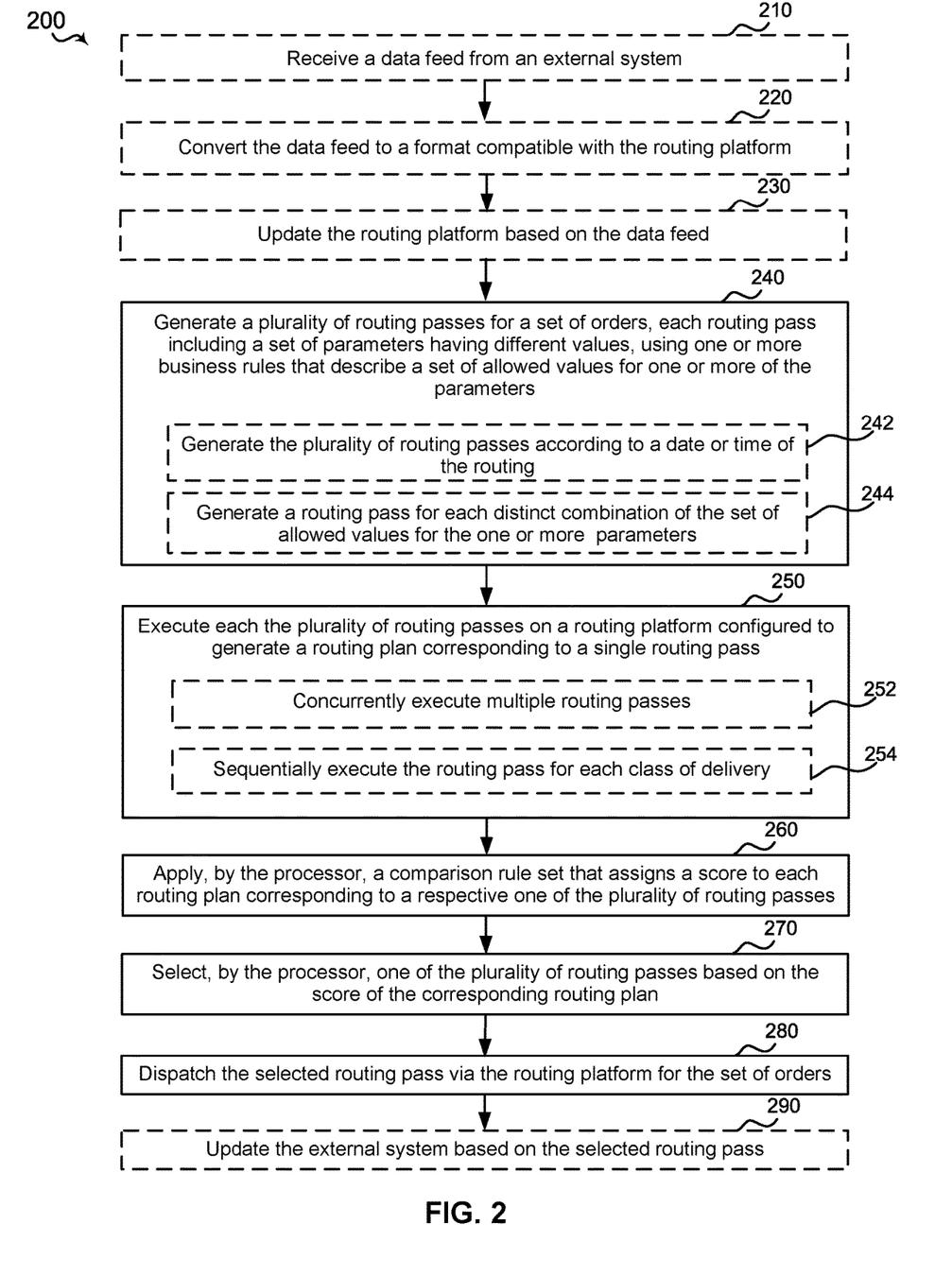
FIG. 2 is a flowchart of an example method of autonomously routing delivery vehicles.

FIG. 2 is a flowchart of an example method 200 of autonomously routing delivery vehicles. The method 200 may be performed by the autonomous routing system 110 in communication with a routing platform 150.

In block 210, the method 200 may optionally include receiving a data feed from an external system. In an aspect, for example, the external system interface 140 may receive a data feed from the external system 170. The external system interface 140 may request the data feed, for example, by submitting a query to the external system 170. The query may be based on interface rules 142, which may define a date and time for the query.

In block 220, the method 200 may optionally include converting the data feed to a format compatible with the routing platform. In an aspect, for example, the external system interface 140 may convert the data feed to a format compatible with the routing platform. For example, the interface rules 142 may include rules for converting the format of the data feed.

In block 230, the method 200 may optionally include updating the routing platform based on the data feed. In an aspect, for example, the external system interface 140 may update the routing platform 150 based on the data feed. For example, the external system interface 140 may update the orders 152 or the resources 156 based on the content of the data feed.

In block 240, the method 200 may include generating a plurality of routing passes for a set of orders, each routing pass including a set of parameters, using one or more business rules that describe a set of allowed values for one or more of the parameters. In an aspect, for example, the routing pass generator 120 may generate a plurality of routing passes 126 for the set of orders, each routing pass including a set of parameters, using one or more business rules 122 that describe a set of allowed values for one or more of the parameters.

For instance, at sub-block 242, the block 240 may optionally include generating the plurality of routing passes according to a date or time of the routing. The business rules 122 may define a date or time to perform the routing. The business rules 122 may also define parameters for a specific date or time. For example, the business rules 122 may allow multi-day routing Monday-Thursday, but not allow multi-day routing on Friday. As another example, the business rules 122 may specify a start time for each day, for example, based on driver schedules. The routing pass generator 120 may determine a time and date to generate the plurality of routing passes based on the one or more business rules. The routing pass generator 120 may select at least one value for the set of parameters based on the time and date according to the one or more business rules.

At sub-block 244, the block 240 may optionally include generating a routing pass for each distinct combination of the set of allowed values for the one or more parameters. For example, the routing pass generator 120 may select a first allowed value each of the one or more parameters for a first routing pass, and a select a second allowed value for a first parameter and the first allowed value for each remaining parameter for a second routing pass. The routing pass generator 120 may proceed through the one or more parameters in a deterministic manner to identify each possible combination. In an aspect, since the number of potential combinations may grow exponentially with the number of parameters, the routing pass generator 120 may limit a number of variable parameters.

In block 250, the method 200 may include executing each the plurality of routing passes on a routing platform configured to generate a routing plan corresponding to a single routing pass. In an aspect, for example, the routing pass generator 120 may execute each the plurality of routing passes on the routing platform 150 that is configured to generate a routing plan 136 corresponding to a single routing pass. For example, the routing pass generator 120 may execute each of the plurality of routing passes via a web interface or application programming interface (API) provided by the routing platform 150.

In an aspect, in sub-block 252, the block 250 may include concurrently executing multiple routing passes. The routing pass generator 120 may send multiple routing passes before the routing platform 150 finishes executing a first routing pass. Generally, the routing platform 150 is configured to handle multiple requests (e.g., from different users), so the routing platform 150 may process the multiple routing passes concurrently (e.g., using parallel resources). Therefore, the autonomous routing system 110 may execute the routing passes more quickly than would be feasible for a human to do. In particular, by executing multiple requests concurrently, the autonomous routing system may determine the best route without delaying dispatch of the routing plan and the delivery process.

In an aspect, at sub-block 254, the block 250 may include sequentially executing the routing pass for each class of delivery. In the case of multiple classes of delivery, the autonomous routing system 110 may provide higher priority to orders by routing a subset of the orders before other orders. Accordingly, when multiple classes of delivery are configured, the routing pass may be executed sequentially for each class in order of priority level. The sequential executions of a routing pass may be performed concurrently with executions of other routing passes (e.g., as in sub-block 252).

In block 260, the method 200 may include applying, by the processor, a comparison rule set that assigns a score to each routing plan corresponding to a respective one of the plurality of routing passes. In an aspect, for example, the routing plan comparator 132 may apply the comparison rule set 132 that assigns a score to each routing plan 136 corresponding to a respective one of the plurality of routing passes 126.

In block 270, the method 200 may include selecting, by the processor, one of the plurality of routing passes based on the score of the corresponding routing plan. In an aspect, for example, the routing plan comparator 132 may select one of the plurality of routing passes 126 based on the score of the corresponding routing plan 136.

In block 270, the method 200 may include dispatching the selected routing pass via the routing platform for the set of orders. In an aspect, for example, the routing plan comparator 132 may dispatch the selected routing pass via the routing platform 150 by submitting a dispatch command including the selected routing pass 138 identifying the selected routing pass.

In block 280, the method 200 may optionally include updating the external system based on the selected routing pass. In an aspect, for example, the external system interface 140 may update the external system 170 based on the selected routing pass. For example, the external system interface 140 may update a status of resources 156.

Figure 3:
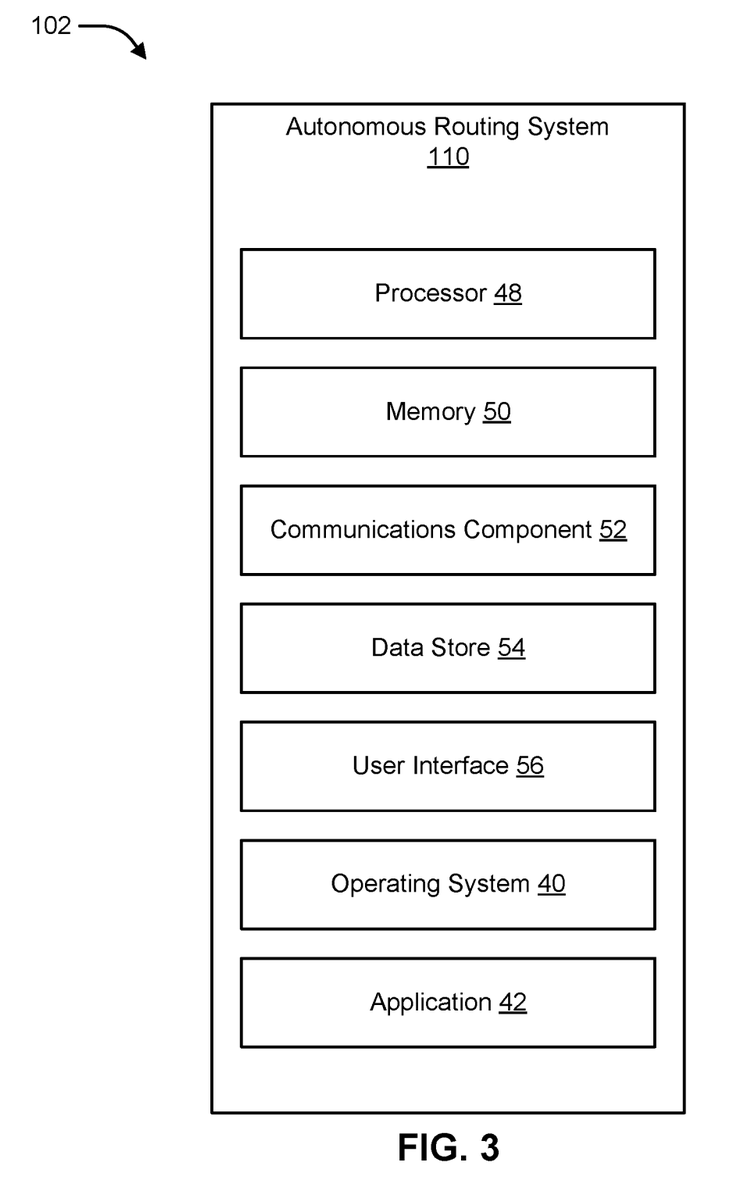
FIG. 3 is a block diagram of an example of the autonomous routing system.

FIG. 3 is a block diagram of an example of the autonomous routing system 110 in accordance with an implementation on a computer device 102, including additional component details as compared to FIG. 1. In one example, autonomous routing system 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include a central processing unit (CPU). In an example, autonomous routing system 110 may include memory 50 for storing instructions executable by the processor 48 for carrying out the functions described herein. In an implementation, for example, memory 50 may store instructions for executing one or more of the routing pass generator 120, routing plan comparator 130, or external system interface 142.

Further, autonomous routing system 110 may include a communications component 52 that provides for establishing and maintaining communications with one or more parties, vehicles, or drones, utilizing hardware, software, and services as described herein. Communications component 52 may carry communications between components on autonomous routing system 110, as well as between autonomous routing system 110 and external devices, such as devices located across a communications network and/or devices serially or locally connected to autonomous routing system 110. For example, communications component 52 may include one or more buses, and may further include transmit chain components and receive chain components associated with a transmitter and receiver, respectively, operable for interfacing with external devices. Communications component 52 may carry communications with routing platform 150 and/or external system 170, for example.

Additionally, autonomous routing system 110 may include a data store 54, which can be any suitable combination of hardware and/or software, that provides for mass storage of information, databases, and programs employed in connection with implementations described herein. For example, data store 54 may be a data repository for operating system 40 and/or applications 42.

Autonomous routing system 110 may also include a user interface component 56 operable to receive inputs from a user of computer device 102 and further operable to generate outputs for presentation to the user. User interface component 56 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 40 and/or application 42. In addition, processor 48 executes operating system 40 and/or application 4, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of autonomously controlling movement of a plurality of delivery vehicles, comprising:
generating, by a processor, a plurality of different routing passes for a set of orders to be delivered by the plurality of delivery vehicles according to a routing plan specifying a plurality of stops for each delivery vehicle to deliver the orders, each routing pass including a set of parameters having different values, using one or more business rules that describe a set of allowed values for one or more of the parameters;
executing, by the processor, each of the plurality of routing passes on a routing platform configured to generate a routing plan for the plurality of delivery vehicles corresponding to a single routing pass for the set of orders, wherein executing each of the plurality of routing passes on the routing platform comprises concurrently executing multiple routing passes;
applying, by the processor, a comparison rule set that assigns a score to each routing plan corresponding to a respective one of the plurality of routing passes;
selecting, by the processor, one of the plurality of routing passes based on the score of the corresponding routing plan; and
dispatching the selected routing pass via the routing platform for the set of orders.

2. The method of claim 1, wherein the comparison rule set includes one or more mandatory conditions that exclude the routing plan from the selecting if the condition is not met.

3. The method of claim 1, wherein the comparison rule set includes one or more balancing conditions that adjust the score based on whether the condition is met.

4. The method of claim 1, wherein the comparison rule assigns a cost score to each routing pass, wherein the selecting the routing pass comprises selecting the routing pass with a lowest cost score.

5. The method of claim 1, further comprising:
receiving a data feed from an external system, the data feed including a status of one or more of the delivery vehicles;
converting the data feed to a format compatible with the routing platform; and
updating the routing platform with a number of vehicles available for the routing plan based on the data feed.

6. The method of claim 5, further comprising updating the external system based on the selected routing pass.

7. The method of claim 5, wherein the business rules are based on a combination of information from the routing platform and the external system.

8. The method of claim 1, wherein the business rules identify at least two classes of deliveries to be routed, each class having a priority level, the method comprising associating a class with each order in the set of orders.

9. The method of claim 8, wherein executing each the plurality of routing passes comprises sequentially executing the routing pass for the orders associated with each class in order of the priority level.

10. The method of claim 1, wherein generating the plurality of routing passes using one or more business rules comprises:
determining a time and date to generate the plurality of routing passes based on the one or more business rules; and
selecting at least one value for the set of parameters based on the time and date according to the one or more business rules.

11. The method of claim 1, wherein generating the plurality of routing passes comprises generating a routing pass for each distinct combination of the set of allowed values for the one or more parameters.

12. A system for routing a plurality of delivery vehicles, comprising:
a memory storing computer-executable instructions;
a communications interface; and
a processor communicatively coupled with the memory and the communications interface and configured to execute the computer-executable instructions to:
generate a plurality of different routing passes for a set of orders to be delivered by the plurality of delivery vehicles according to a routing plan specifying a plurality of stops for each delivery vehicle to deliver the orders, each routing pass including a set of parameters having different values, using one or more business rules that describe a set of allowed values for one or more of the parameters;
execute each of the plurality of routing passes on a routing platform configured to generate a routing plan for the plurality of delivery vehicles corresponding to a single routing pass for the set of orders, wherein executing each of the plurality of routing passes on the routing platform comprises concurrently executing multiple routing passes;
apply a comparison rule set that assigns a score to each routing plan corresponding to a respective one of the plurality of routing passes;
select one of the plurality of routing passes based on the score of the corresponding routing plan; and
dispatch the selected routing pass via the routing platform for the set of orders.

13. The system of claim 12, wherein the comparison rule set includes:
one or more mandatory conditions that exclude the routing plan from the selecting if the mandatory condition is not met; and
one or more balancing conditions that adjust the score based on whether the balancing condition is met.

14. The system of claim 12, wherein the comparison rule assigns a cost score to each routing pass, wherein the selecting the routing pass comprises selecting the routing pass with a lowest cost score.

15. The system of claim 12, wherein the processor is configured to execute the instructions to: receive a data feed from an external system, the data feed including a status of one or more of the delivery vehicles;
convert the data feed to a format compatible with the routing platform; and
update the routing platform with a number of vehicles available for the routing plan based on the data feed.

16. The system of claim 15, wherein the processor is configured to execute the instructions to update the external system based on the selected routing pass.

17. The system of claim 12, wherein the business rules identify at least two classes of deliveries to be routed, each class having a priority level, wherein the processor is configured to execute the instructions to:
associate one or the classes with each order in the set of orders; and
sequentially execute the routing pass for the orders associated with each class in order of the priority level.

18. A non-transitory computer-readable medium storing computer-executable instructions, comprising instructions to:
- generate a plurality of different routing passes for a set of orders to be delivered by a plurality of delivery vehicles according to a routing plan specifying a plurality of stops for each delivery vehicle to deliver the orders, each routing pass including a set of parameters having different values, using one or more business rules that describe a set of allowed values for one or more of the parameters;
- execute each of the plurality of routing passes on a routing platform configured to generate a routing plan for the plurality of delivery vehicles corresponding to a single routing pass for the set of orders, wherein executing each of the plurality of routing passes on the routing platform comprises concurrently executing multiple routing passes;
- apply a comparison rule set that assigns a score to each routing plan corresponding to a respective one of the plurality of routing passes;
- select one of the plurality of routing passes based on the score of the corresponding routing plan; and
- dispatch the selected routing pass via the routing platform for the set of orders.

* * * * *